United States Patent [19]

Shibata et al.

[11] Patent Number: 5,071,798
[45] Date of Patent: Dec. 10, 1991

[54] HEAT-RESISTANT AND INORGANIC SHAPED ARTICLE

[75] Inventors: Kenichi Shibata; Koichi Kimura; Yuji Kanamori, all of Kanagawa, Japan

[73] Assignee: Nichias Corporation, Tokyo, Japan

[21] Appl. No.: 409,300

[22] Filed: Sep. 19, 1989

[30] Foreign Application Priority Data

Sep. 26, 1988 [JP] Japan ................. 63-239041

[51] Int. Cl.$^5$ ............................ C04B 35/80
[52] U.S. Cl. ...................... 501/95; 501/127; 501/153
[58] Field of Search ............ 501/95, 127, 153

[56] References Cited

U.S. PATENT DOCUMENTS 4,125,407 11/1978 Ueno .................... 501/127
4,849,382 7/1989 Shibata et al. ......... 501/128

FOREIGN PATENT DOCUMENTS 1326386 4/1963 France ................. 501/127
1054618 11/1974 Japan .................. 501/95
1091071 5/1986 Japan .................. 501/95
0871511 6/1961 United Kingdom ....... 501/95

Primary Examiner—William R. Dixon, Jr.
Assistant Examiner—C. Melissa Bonner
Attorney, Agent, or Firm—Cushman, Darby & Cushman

[57] ABSTRACT

A heat-resistant and inorganic shaped article comprising a homogeneous mixture of an alumina powder having an average particle size of 10–50 μm and polycrystalline alumina fibers that are bound together with amorphous silica or alumina. The article has a bulk density of 0.4–1.5 g/cm$^3$ and a total $Al_2O_3$ content of at least 75 wt %.

6 Claims, No Drawings

HEAT-RESISTANT AND INORGANIC SHAPED ARTICLE

BACKGROUND OF THE INVENTION

The present invention relates to an inorganic lightweight shaped article having a high degree of heat resistance.

Heat-resistant, inorganic and lightweight shaped articles made from mixtures of heat-resistant inorganic fibers and heat-resistant inorganic powders using inorganic binders have been known [see, for example, JP-A-59-88378 (the term "JP-A" as used herein means an "unexamined published Japanese patent application") and JP-A-63-206367]. However, most of the conventional "heat-resistant" shaped articles can only withstand temperatures of up to about 1,700° C. and if a greater extent of heat resistance is required, it has been necessary to use heavy-duty refractories such as refractory bricks.

SUMMARY OF THE INVENTION

An object, therefore, of the present invention is to provide an inorganic lightweight shaped article that is low in heat capacity and thermal conductivity and which yet has a high degree of heat resistance that withstands prolonged used at a temperature as high as 1,800° C.

To attain this object, the present invention offers the following two types of novel inorganic shaped article:

(1) A heat-resistant and inorganic shaped article comprising a homogeneous mixture of an alumina powder having an average particle size of 10-50 $\mu$m and polycrystalline alumina fibers that are bound together with amorphous silica or alumina, said article having a bulk density of 0.4-1.5 g/cm$^3$ (this article is hereunder referred to as the shaped article according to the second aspect of the present invention).

DETAILED DESCRIPTION OF THE INVENTION

What is most important about the shaped article of the present invention is that whether it is according to the first or second aspect, the alumina powder used as a heat-resistant inorganic powder is composed of much coarser particles than those which have been used in the relevant field of art. Stated more specifically, alumina commonly used in the manufacture of inorganic shaped articles has been very fine and has had an average particle size of no more than about 5 $\mu$m. Alumina particles as coarse as those to be employed in the present invention have not been used as forming materials, except in very limited areas where they are used in only small amounts as powders spread over the ceramic article firing setter to prevent reaction with the work. In the shaped article of the present invention, these coarse alumina particles are reinforced with crystalline alumina fibers to form building blocks, so that the number of points where alumina particles contact with themselves and with alumina fibers is smaller than when the shaped article is composed of fine alumina particles. Because of this feature, the shaped article of the present invention could satisfactorily be used at temperatures of 1,800° C. and above without experiencing a substantial degree of reactive sintering which would otherwise lead to shrinkage, deformation or disintegration. The particularly preferred particle size of the alumina powder is within the range of 15-30 $\mu$m.

Even if the alumina powder has an average particle size of 10-50 $\mu$m, a desired article cannot be obtained if the silica content is too high. The excess silica will form a liquid phase at temperatures of 1,800° C. and above, thereby impairing the heat resistance of the shaped article. Therefore, it is preferable the total alumina content of the shaped article be 75 wt%. Components other than alumina and silica are also deleterious to heat resistance and should hence be absent from the shaped article. Desirably, the sum of total $Al_2O_3$ content and total $SiO_2$ content should account for at least 99% of the shaped article. If the bulk density of the shaped article exceeds 1 5 g/cm$^3$, it becomes impossible to prevent the occurrence of reactive sintering at elevated temperatures even if coarse alumina particles are used. If the weight of the shaped article is reduced too much, its structure becomes so porous as to be highly susceptible to thermal creep. Therefore, the shaped article should not be rendered so lightweight as to have a bulk density lower than 0.4 g/cm$^3$.

The shaped article of the present invention can be produced by the process which is described below in detail. The alumina powder may be sintered or electrofused alumina and should preferably comprise particles of the highest possible purity having an average size of 10-50 $\mu$m. Particles coarser than 50 $\mu$m are advantageous from the viewpoint of resistance to sintering but, on the other hand, they are not preferred since they are incapable of providing a shaped article having adequate strength.

The polycrystalline alumina fibers used as reinforcing elements are not limited in any particular way but those having high heat resistance are, of course, preferred.

The alumina fibers and the alumina powder are mixed in such proportions that their weight ratio if preferably within the range of from 70:30 to 10:90.

Illustrative binders that can be used are colloidal silica, collodial alumina and mixtures thereof. The binder is preferably used in an approximate amount of 3%-15% of the total weight of the shaped article. If the binder is used in an excessive amount, the shaped article will become so dense as to impair its heat resistance (i.e., it becomes prone to reactive sintering). If colloidal silica is to be used as a binder, care should be taken so that the total $SiO_2$ content of the product will not exceed 25 wt%.

In producing the shaped article of the present invention, forming aids such as flocculants and organic binders may be used in addition to the binder described above.

The necessary raw materials are mixed in the proportions specified above and with a suitable amount of water added (it may be added before mixing, too), the overall mixture is conditioned to either wet o slurried state. Subsequently, the mix is given a shape by a conventional method of dehydrative forming such as dehydrative press forming or vacuum forming. The shaping condition should be such as to provide the final product with a density of 0.4-1.5 g/cm$^3$.

When the shaped article is dried, hardened amorphous silica or alumina will form from the binder and the shaped article is in accordance with the first aspect of the present invention in that the alumina fibers and the alumina powder are bound with such hardened amorphous silica or alumina.

By subsequent firing at a temperature of about 1,500° C. or above, a shaped article that has a higher degree of thermal stability in accordance with the second aspect of the present invention can be obtained with mullite serving as a binder between the alumina fibers and the alumina powder. Mullite ($3Al_2O_3.2SiO_2$) forms when colloidal silica is used as a binder and the mechanism of mullite formation is through the reaction between the surface layer of alumina fibers and amorphous silica or the crystalline silica cristobalite which results therefrom. If cristobalite remains unreacted on account of incomplete firing, a volume change will occur when cristobalite makes transition between two crystallographic shaped (cristobalite has two crystal shapes that occur in two different temperature regions the borderline of which is about 250° C.), so that the shaped article is prone to cracking upon heat cycles. The disappearance of cristobalite can be verified by a customary technique of powder X-ray diffraction. When colloidal alumina is use as a binder, it is converted to corundum upon firing (a small amount of mullite will also form as a result of reaction between the silica content of alumina fibers and the colloidal alumina), again contributing to the formation of a highly stable structure.

The shaped article according to the first aspect of the present invention becomes a shaped article of the second aspect either by firing at 1,400°–1,600° C. prior to use or by exposure to elevated temperatures after the start of use. In either way, amorphous silica is converted to mullite, and amorphous alumina to corundum.

EXAMPLES

The following examples and comparative examples are given in order to further illustrate the present invention.

The following raw materials were used in each of the examples and comparative examples:

| Polycrystalline alumina fibers: | fiber diameter, 3 μm; average fiber length, 50 mm; $Al_2O_3$ content, 95% |
|---|---|
| Alumina powder: | sintered alumina |
| Binder: | Colloidal silica or colloidal alumina. |

The polycrystalline alumina fiber and the refractory (alumina) powder were dispersed in water and mixed with the binder and aluminum sulfate under agitation. The agitated dispersion was subjected to dehydrative forming under suction. The shaped article obtained was dried with hot air. When a shaped article of the second aspect was to be obtained, the thus obtained article was fired at 1,500° C. for 5h to have the binder converted to mullite or corundum.

Similar experiments were conducted with the proportions of the raw materials and the conditions of treatment being varied as shown in Table 1. The results are also shown in Table 1, together with the results of comparative experiments. "Resistance to spalling" was tested by the following method: test pieces each measuring 20 mm thick, 200 mm long and 200 mm wide were held at a predetermined temperature in a furnace for 1 h and subsequently quenched to check for the occurrence of cracking; those test pieces which did not experience any crack development were subjected to another crack test with the furnace temperature raised to a higher value; the same procedure was repeated until cracking developed in all test pieces and the temperature at which cracking developed in a specific test piece was used as an index for its resistance to spalling.

As described above, the lightweight refractory of the present invention is characterized in that coarse alumina particles that are resistant to reactive sintering are reinforced with highly heat-resistant polycrystalline alumina fibers. Thus, the refractory exhibits much greater heat resistance than conventional aluminous lightweight refractories and can be used continuously in a hot atmosphere ($\geq 1,800°$ C.) without experiencing any substantial shrinkage in volume. In particular, a shaped article according to the second aspect of the present invention in which the alumina particles and fibers are bound with mullite and/or corundum has such a stable structure that it can be immediately used as a high-performance lightweight refractory.

TABLE 1

|  | Example | | | Comparative Example | | |
|---|---|---|---|---|---|---|
|  | 1 | 2 | 3 | 1 | 2 | 3 |
| Raw materials (wt %) | | | | | | |
| Alumina fiber | 30 | 30 | 30 | 30 | 30 | 75 |
| Alumina powder (25 μm) | 70 | 70 | 70 |  |  | 25 |
| Alumina powder (2 μm) |  |  |  | 70 |  |  |
| Alumina powder (80 μm) |  |  |  |  | 70 |  |
| Colloidal silica | 10 | 10 |  | 10 | 10 | 10 |
| Colloidal alumina |  |  | 10 |  |  |  |
| Total $Al_2O_3$ (wt %) | 90 | 90 | 99 | 90 | 90 | 87 |
| Firing after shaping | present | absent | present | present | present | present |
| Bulk density of the shaped article (g/cm³) | 0.66 | 0.65 | 0.66 | 0.73 | 0.54 | 0.25 |
| Dimensional change upon heating (%) | | | | | | |
| 1,800° C. × 3 h, length | 0.3 | 1.0 | 0.5 | 1.8 | 1.5 | 4.0 |
| 1,800° C. × 3 h, thickness | 1.0 | 1.7 | 1.5 | 1.8 | 2.5 | 2.4 |
| 1,800° C. × 100 h, length | 0.6 | 1.3 | 0.7 | 9.0 | 8.6 | 6.9 |
| 1,800° C. × 100 h, thickness | 2.8 | 3.5 | 3.0 | 11.2 | 15.6 | 19.2 |
| Resistance to spalling (°C.) | 1000 | 800 | 900 | 600 | 700 | 800 |

We claim:

1. A heat-resistant and inorganic shaped article consisting essentially of a homogeneous mixture of from 10 to 70 wt. % of an alumina powder having an average particle size of 10–50 μm, and from 30 to 90 wt. % of polycrystalline alumina fibers that are bound together with from 3 to 15 wt. % of amorphous silica or alumina, said article having a bulk density of 0.4–1.5 g/cm³.

2. The article according to claim 1, wherein a total $Al_2O_3$ content is at least 75 wt%.

3. The article according to claim 1, wherein the average particle size of the alumina powder is in the range of 15 to 30 μm.

4. A heat-resistant and inorganic shaped article consisting essentially of a homogeneous mixture of an alumina powder having an average particle size of 10–50 μm and polycrystalline alumina fibers that are bound together with mullite or corundum, with $Al_2O_3$ content of at least 75 wt. %, and with said article having a bulk density of 0.4–1.5 g/cm³.

5. The article according to claim 4, wherein the average particle size of the alumina powder is in the range of 15 to 30 μm.

6. The article according to claim 4, wherein said fibers are bound together with mullite and corundum.

* * * * *